United States Patent
Sun et al.

(10) Patent No.: US 9,915,178 B2
(45) Date of Patent: Mar. 13, 2018

(54) ONLINE HEURISITC ALGORITHM FOR COMBINED COOLING HEATING AND POWER PLANT OPTIMIZATION

(71) Applicant: Siemens Corporation, Iselin, NJ (US)

(72) Inventors: Yu Sun, Plainsboro, NJ (US); Amit Chakraborty, East Windsor, NJ (US)

(73) Assignee: Siemens Corporation, Iselin, NJ (US)

(*) Notice: Subject to any disclaimer, the term of this patent is extended or adjusted under 35 U.S.C. 154(b) by 617 days.

(21) Appl. No.: 14/382,378

(22) PCT Filed: Mar. 7, 2013

(86) PCT No.: PCT/US2013/029488
§ 371 (c)(1),
(2) Date: Sep. 2, 2014

(87) PCT Pub. No.: WO2013/134455
PCT Pub. Date: Sep. 12, 2013

(65) Prior Publication Data
US 2015/0134120 A1   May 14, 2015

Related U.S. Application Data

(60) Provisional application No. 61/607,787, filed on Mar. 7, 2012.

(51) Int. Cl.
*G05B 21/00* (2006.01)
*F01K 23/10* (2006.01)
(Continued)

(52) U.S. Cl.
CPC ............ *F01K 23/101* (2013.01); *F01K 13/02* (2013.01); *G05B 13/021* (2013.01); *F01K 3/00* (2013.01); *F24D 19/10* (2013.01); *F28D 20/0039* (2013.01); *F28F 2200/00* (2013.01); *H02J 3/38* (2013.01); *H02J 2003/007* (2013.01);
(Continued)

(58) Field of Classification Search
CPC ........ F24F 11/006; G06Q 10/083; F17C 5/02; F01K 23/101
See application file for complete search history.

(56) References Cited

U.S. PATENT DOCUMENTS 8,417,391 B1* 4/2013 Rombouts ............. G05B 13/02
                                                    700/286
2002/0082747 A1   6/2002 Kramer
(Continued)

OTHER PUBLICATIONS

Chandan et al., "Modeling and Optimization of a Combined Cooling, Heating and Power Plant System", 2012 American Control Conference, Fairmont Queen Elizabeth, Montreal, Canada, Jun. 27-Jun. 29, 2012, pp. 3069-3074.
(Continued)

*Primary Examiner* — Tuan Vu

(57) ABSTRACT

A method of real-time optimization for a Combined Cooling, Heating and Power system, including determining a first operation sequence of a plurality of chillers and at least one thermal energy storage tank in the system over a time period (410) and determining a second operation sequence of the plurality of chillers and at least one thermal energy storage tank in the system over the time period by using the first operation sequence as input to a greedy algorithm (420).

20 Claims, 5 Drawing Sheets

(51) Int. Cl.
  F01K 13/02 (2006.01)
  G05B 13/02 (2006.01)
  F24D 19/10 (2006.01)
  F28D 20/00 (2006.01)
  H02J 3/38 (2006.01)
  H02J 3/00 (2006.01)
  F01K 3/00 (2006.01)

(52) U.S. Cl.
  CPC ............... *Y02E 20/14* (2013.01); *Y02E 40/76* (2013.01); *Y04S 10/545* (2013.01)

(56) References Cited

U.S. PATENT DOCUMENTS

| | | | |
|---|---|---|---|
| 2008/0209916 A1* | 9/2008 | White | F17C 5/02 62/48.1 |
| 2010/0154438 A1* | 6/2010 | Bean, Jr. | H05K 7/20818 62/3.63 |
| 2011/0066258 A1 | 3/2011 | Chakraborty | |
| 2011/0307407 A1* | 12/2011 | Neagu | G06Q 10/083 705/337 |
| 2012/0041610 A1 | 2/2012 | Halwan | |
| 2012/0296480 A1* | 11/2012 | Raman | G05B 13/026 700/277 |
| 2013/0046411 A1* | 2/2013 | Al Faruque | H02J 3/32 700/286 |
| 2013/0085614 A1* | 4/2013 | Wenzel | F24F 11/006 700/277 |
| 2013/0134780 A1* | 5/2013 | Parsonnet | H02J 3/005 307/25 |

OTHER PUBLICATIONS

Ma et al., "Model Predictive Control of Thermal Energy Storage in and Building Cooling Systems". In Proceedings of the 48th IEEE Conference on Decision Control, 2009.

Lucas B. Hyman, P.E., and Federick Bockmiller, P.E., "Primary Chilled Water Loop Retrofit", ASHRAE Journal Dec. 2000, pp. 1-5.

D.W. Wu, R.Z. Wang, "Combined cooling, heating and power: A review", ScienceDirect, Progress in Energy and Combustion Science 32 (2006) pp. 459-495.

* cited by examiner

ONLINE HEURISITC ALGORITHM FOR COMBINED COOLING HEATING AND POWER PLANT OPTIMIZATION

CROSS-REFERENCE TO RELATED APPLICATION

This application claims priority to U.S. provisional application No. 61/607,787, filed Mar. 7, 2012, the disclosure of which is incorporated by reference herein in its entirety.

BACKGROUND OF THE INVENTION

1. Technical Field

The present invention relates to Combined Cooling, Heating and Power (CCHP) systems, and more particularly, to the optimization of a CCHP system for energy and cost savings.

2. Discussion of the Related Art

CCHP systems integrate cooling, heating and power generation capabilities on one site. A key feature of this technology is that waste heat is recovered and utilized to satisfy thermal demands such as space heating, cooling and hot water needs in a facility. A CCHP system can improve overall energy efficiency so that facility operation cost can be reduced. A CCHP system can potentially reduce emissions (e.g., since less fuel is burned to meet the same demand) and enhance energy reliability (e.g., by way of distributed, on-site generation). These features have made CCHP systems a popular energy efficient solution to meet thermal and electricity demands.

To realize the full potential of cost reduction for CCHP systems, carefully designed control systems are needed. CCHP systems are comprised of various components. The dynamics of these components can be very different, and may have different time scales. A Real-Time-Optimization (RTO)/supervisory control framework is usually employed to control such systems. Decision making in RTO involves two layers: on the higher level, set-points for all components are determined by solving an optimization problem that aims to minimize some economic cost function; on the lower level, the control problems are handled apart from the optimization, on a faster scale: feedback controllers ensure that all components track their set-points.

Due to the size and complexity of CCHP systems, the optimization problem can be very large and highly nonlinear. It is challenging to solve such problems in real-time. Integer variables add more difficulty to the already complex problem. In a CCHP system, the integer variables could come from the on/off states of components, charging/discharging status for thermal energy storage (TES), or any component that operates in a discrete manner. For such a large mixed integer nonlinear program (MINLP) a straightforward approach is used to solve the optimization directly using commercial solvers. However, this is not efficient as it fails to address the structure of the particular problem. It can be time-consuming for the solution to converge to a desired accuracy, thus making it difficult to meet the real-time requirement.

SUMMARY OF THE INVENTION

According to an exemplary embodiment of the present invention, there is provided a method of real-time optimization for a Combined Cooling, Heating and Power (CCHP) system, comprising: determining a first operation sequence of a plurality of chillers and at least one thermal energy storage tank in the system over a time period; and determining a second operation sequence of the plurality of chillers and at least one thermal energy storage tank in the system over the time period by using the first operation sequence as input to a greedy algorithm.

The cost of satisfying cooling demand by performing the second operation sequence for the time period is less than the cost of satisfying cooling demand by performing the first operation sequence for the time period.

The method further comprises ranking the chillers according to their efficiency prior to determining the first operation sequence.

The second operation sequence includes set-points for each sub-time period of the time period.

The set-points include on/off states for each chiller, total chilled water supplied by the system, operating power level of at least one gas turbine of the system, or power purchased from a power grid.

The time period is more than one hour.

The method further comprises outputting the second operation sequence.

According to an exemplary embodiment of the present invention, there is provided a system for real-time optimization for a CCHP system, comprising: a memory device for storing a program; a processor in communication with the memory device, the processor operative with the program to: determine an initial operation sequence of a plurality of chillers and at least one thermal energy storage tank in the system over a time period; and determine an optimal operation sequence of the plurality of chillers and at least one thermal energy storage tank in the system over the time period by using the initial operation sequence as input to a greedy algorithm.

The cost of satisfying cooling demand by performing the optimal operation sequence for the time period is less than the cost of satisfying cooling demand by performing the initial operation sequence for the time period.

The processor is further operative with the program to rank the chillers according to their efficiency prior to determining the initial operation sequence.

The optimal operation sequence includes set-points for each sub-time period of the time period.

The set-points include on/off states for each chiller, total chilled water supplied by the system, operating power level of at least one gas turbine of the system, or power purchased from a power grid.

The time period is more than one hour.

The processor is further operative with the program to output the optimal operation sequence.

According to an exemplary embodiment of the present invention, there is provided a computer program product for real-time optimization for a CCHP system, comprising: a non-transitory computer readable storage medium having computer readable program code embodied therewith, the computer readable program code comprising: computer readable program code configured to perform the steps of: determining an initial operation sequence of a plurality of chillers and at least one thermal energy storage tank in the system over a time period; and determining an optimal operation sequence of the plurality of chillers and at least one thermal energy storage tank in the system over the time period by using the initial operation sequence as input to a greedy algorithm.

The cost of satisfying cooling demand by performing the optimal operation sequence for the time period is less than the cost of satisfying cooling demand by performing the initial operation sequence for the time period.

The computer readable program code is further configured to perform the step of ranking the chillers according to their efficiency prior to determining the initial operation sequence.

The optimal operation sequence includes set-points for each sub-time period of the time period.

The set-points include on/off states for each chiller, total chilled water supplied by the system, operating power level of at least one gas turbine of the system, or power purchased from a power grid.

The time period is 24 hours and each sub-time period is 1 hour.

DETAILED DESCRIPTION OF EXEMPLARY EMBODIMENTS

In accordance with an exemplary embodiment of the present invention, disclosed is a real-time optimization (RTO) formulation for Combined Cooling, Heating and Power (CCHP) plants, which provide cooling/heating and electricity to a large campus/facility. An objective of the inventive RTO algorithm is to explore the energy saving potential provided by co-generation and Thermal Energy Storage (TES), such that the total operating cost is minimized, while satisfying both cooling demand and electricity demand.

Our model used for optimization is built by integrating a variety of component models together, which involve nonlinearities and integer variables. At each time step, an optimal action sequence it obtained by solving a large mixed integer nonlinear program (MINLP). A dual-stage heuristic algorithm finds suboptimal solutions in real-time.

In detail, we consider the situation when chillers in a CCHP system are operated as ON-OFF components. To generate ON-OFF set points we solve a large MINLP based on current system states, current and predicted future demand and other parameters. The possible operating status combinations for N chillers in a time window of k hours is $2^{Nk}$ Our goal is to find efficient solutions to such a MINLP by exploring the structure in such optimization problems. This is achieved by introducing a series of approximations and decompositions. In particular, the MINLP optimization problem is reformulated into a resource allocation problem. It is then solved using a greedy algorithm to obtain suboptimal solutions.

The remainder of this disclosure is organized as follows. An overview of the CCHP system and the component models is first provided, along with the formulation of the optimization problem. Next, we reduce the complexity of an original MINLP by examining its structure, and present the inventive heuristic algorithm in detail.

Problem Formulation

Figure 1:
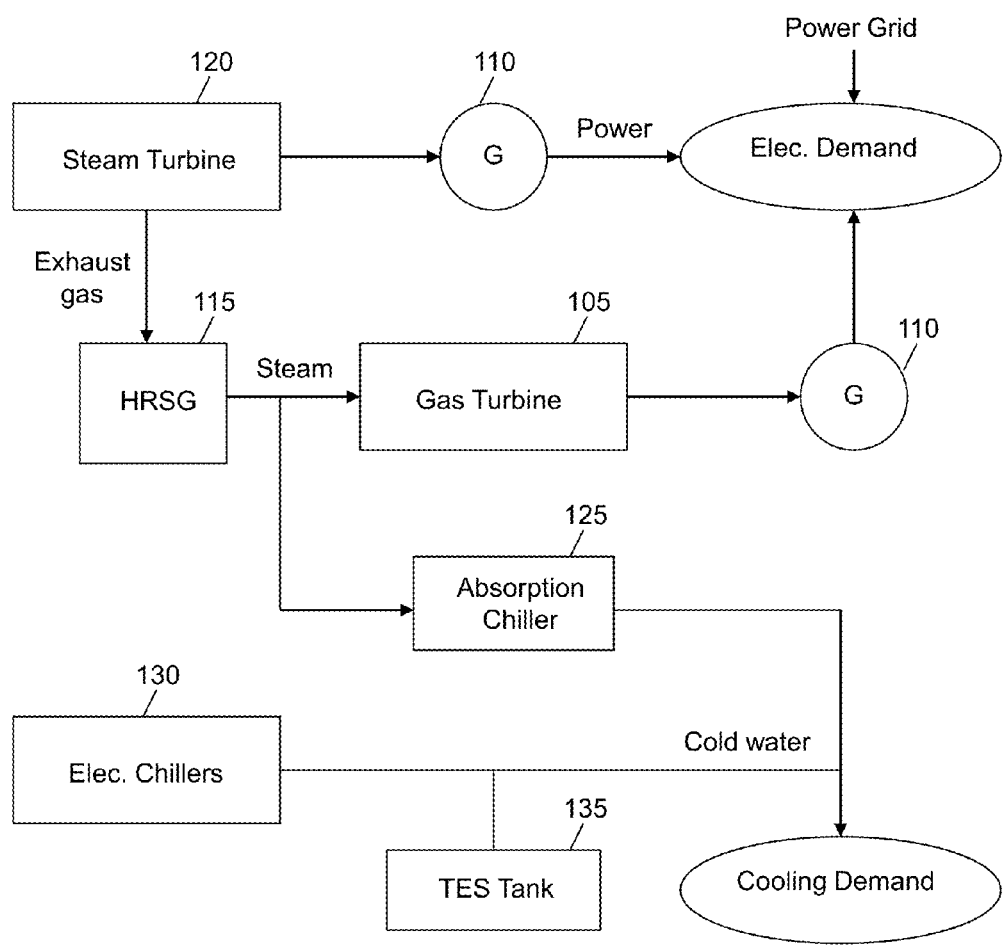
FIG. 1 is schematic plot for a typical Combined Cooling, Heating and Power (CCHP) system.

System Description—CCHP is a general term referring to many systems of different configurations. A typical CCHP system is depicted in FIG. 1. It may have the following components:

A gas turbine (GT) 105 and generator 110, which is the primary source for electricity power;

A heat recovery steam generator (HRSG) unit 115 which uses waste heat in exhaust gas from the GT 105 to generate steam, which can then be used for heating;

The steam can also be used for electricity generation by driving a steam turbine (ST) 120;

Exhaust gas is utilized in an absorption chiller 125 to generate cooling;

A group of electric chillers 130 may also supply cold water to a campus to meet its cooling demand; and The cold water from chillers can be stored in a thermal energy storage (TES) tank 135 for later use.

The RTO/supervisory control may coordinate the operation of all above components, yet it is not shown in FIG. 1. To some extent it is of greater importance than other components, e.g., a good RTO/supervisory control can dramatically improve overall energy efficiency. To formulate the higher-level optimization problem, tractable models for chillers, TES, GT and ST are needed.

Component Models—Detailed models for components in the central plant are generally not suitable for the purpose of optimization, mainly due to their complexity. Reduced order models for components were developed in Chandan et al. "Modeling and Optimization of a Combined Cooling, Heating and Power Plant System," 2012 American Control Conference, Jun. 27-Jun. 29, 2012 (Chandan), the disclosure of which is incorporated by reference herein in its entirety. The component models described hereinafter are adopted from Chandan (except for chillers) by taking their functional forms and ignoring other problem specific aspects. It is to be understood, however, that other component models may be used in accordance with the present invention.

Chillers: In accordance with an exemplary embodiment of the present invention, chillers are modeled as ON-OFF components, e.g., the chillers are operated by ON-OFF signals, instead of by set-points such as the chilled water supply mass flow rate $m_{CHW,i}$ and temperature $T_{CHWS,i}$. The operating status of the i-th chiller at time step k is denoted as binary variable $\theta_i(k)$. The chiller set-point at time k is denoted as a binary vector $\theta(k)=[\theta_1(k), \theta_2(k), \ldots, \theta_{n_c}(k)]$, where $n_c$ is the number of chillers.

When a chiller is on, it is assumed that it operates at near-maximum capacity. The chilled water flow rate through each chiller is maintained constant. It is also assumed that the chilled water supply temperature and return water temperature are controlled to be around their design value. Therefore, the amount of cooling it provides, and its electricity consumption are both nearly constant.

Figure 2:
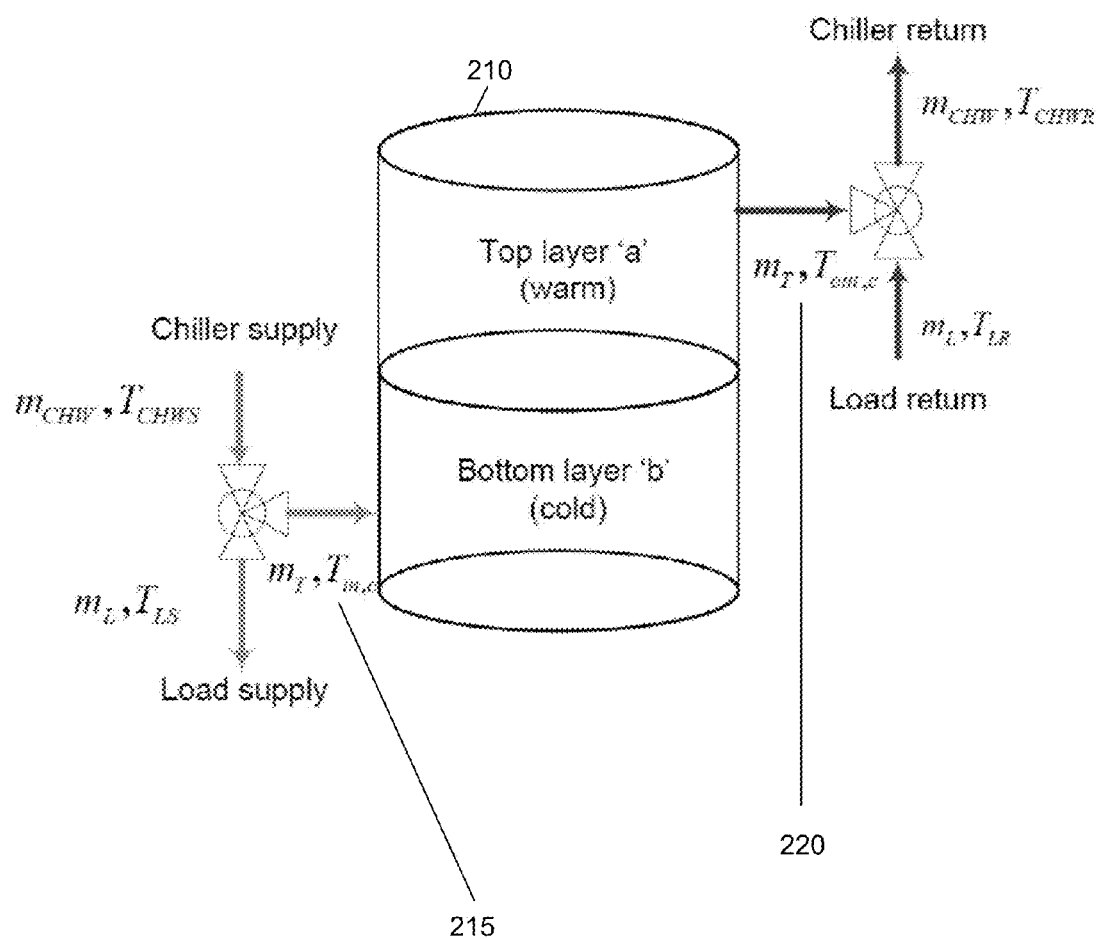
FIG. 2 is a schematic plot for a Thermal Energy Storage (TES) tank.

Thermal Energy Storage: The two layer TES model developed in Chandan is used. An example of the TES model is shown by 200 in FIG. 2. The model is further simplified by ignoring the time delays of TES tank 210 output. It is assumed that the TES tank 210 is always full, and the mass flow rate entering 215 the tank is always equal to the mass flow rate exiting 220 the tanks. The governing equations for the TES model are:

(a). Charging mode (when $m_{CHW} \geq m_L$)
Overall mass balance:

$$m_T = m_{CHW} - m_L \quad (1)$$

Top layer energy balance:

$$pc_{pw}\frac{dT_a}{dt} = f_{a,c}m_T c_{pw}(T_b - T_a) + U_c A(T_b - T_a) \quad (2)$$

Bottom layer energy balance:

$$pc_{pw}\frac{dT_b}{dt} = f_{b,c}m_T c_{pw}(T_{in,c} - T_b) + U_c A(T_a - T_b) \quad (3)$$

Supply value energy balance:

$$T_{in,c} = T_{LS} = T_{CHWS} \quad (4)$$

Return value energy balance:

$$m_T T_{out,c} + m_L T_{LR} = m_{CHW} T_{CHWR} \quad (5)$$

(b). Discharging mode (when $m_{CHW} \leq m_L$)
Overall mass balance:

$$m_T = m_L - m_{CHW} \quad (6)$$

Top layer energy balance:

$$pc_{pw}\frac{dT_a}{dt} = f_{a,d}m_T c_{pw}(T_{in,d} - T_a) + U_d A(T_b - T_a) \quad (7)$$

Bottom layer energy balance:

$$pc_{pw}\frac{dT_b}{dt} = f_{b,d}m_T c_{pw}(T_a - T_b) + U_d A(T_a - T_b) \quad (8)$$

Supply valve energy balance:

$$m_T T_{out,d} + m_{CHW} T_{CHWS} = m_L T_{LS} \quad (9)$$

Return valve energy balance:

$$T_{in,d} = T_{LR} = T_{CHWR} \quad (10)$$

Discretized versions of these equations serve as dynamic constraints in the MINLP.

Gas Turbine, HRSG and Steam Turbine: A gas turbine model was built in Chandan via regression analysis, but only for the input and output variables that are relevant from the optimization perspective. The input variable is the desired electrical power produced by GT, $W_{GT}$. The output variables are the natural gas mass flow rate $m_f$, the exhaust gas mass flow rate $m_g$ and Turbine Exit Temperature (TET):

$$m_f = P_1(W_{GT}) \quad (11)$$

$$m_g = P_2(W_{GT}) \quad (12)$$

$$TET = P_4(W_{GT}) \quad (13)$$

where $P_n(x)$ denotes an n-th order polynomial of variable x.

Under a set of assumptions on HRSG and steam loop, the electricity power generated by a steam turbine can be modeled as a nonlinear function of $m_g$ and TET:

$$W_{ST} = f_{ST}(m_g, TET). \quad (14)$$

The power consumption for pumps in the steam loop is given by $$W_{p,1} = \frac{m_{w1}}{p}(P_{dae} - P_{cond,1}) \quad (15)$$

-continued $$W_{p,2} = \frac{m_w}{p}(P_{w,in} - P_{dae}) \quad (16)$$

where $m_w$ is the water mass flow rate through HRSG $$m_{w1} = f_1^w m_w \quad (17)$$

$$m_{w2} = (1 - f_1^w) m_w \quad (18)$$

MINLP Problem Formulation—An objective of the inventive real-time optimization is to find the optimal sequence of set-points such that both cooling and electricity demand on campus are satisfied while the operation cost of the central plant in minimized. In an exemplary embodiment of the present invention, we use a 24-hour look ahead period for the optimization. Although other time periods may be used.

For each of the 24-hour look ahead period, the following variables are determined, which then serve as the set-points for lower level controllers to track:
ON/OFF states for each chiller, $\theta_{CH,i}(k)$
Total chilled water supply to campus, $m_L(k)$
Operating power level of gas turbine, $W_{GT}(k)$
Power purchased from grid, $W_{grid}(k)$ The optimization problem $P_1$ is formulated as follows:

$$\min_{u(1),\ldots,u(24)} \sum_{i=1}^{24} C(x(i), u(i))$$

subject to $$x(i) \in X, i=1,2,\ldots 24$$

$$u(i) \in U, i=1,2,\ldots 24$$

$$x(k+1) = f(x(k), u(k))$$

$$g(x(k), u(k), r(k)) = 0$$

where $$u(k) = [\theta_{CH,i}(k); m_L(k); W_{GT}(k); E_{grid}(k)]$$

$$x(k) = [T_a(k); T_b(k)]$$

$$r(k) = [Q_{dem}(k), E_{dem}(k)]$$

Here, the system state $x(t)$ is just the state of the TES tank since it is the only dynamic component in the simplified system model. $Q_{dem}$ and $E_{dem}$ are the predicted values of cooling and electricity demand in the 24-hour look ahead time window.

Objective Function: The cost function $C(x(k),u(k))$ represents the grid electricity cost for the central plant at hour k.

$$C(x(k), u(k)) = c_{grid}(k) W_{grid}(k) + c_{fuel}(k) m_f(k) \quad (19)$$

where $c_{grid}$ is the price of purchasing electricity from the grid, $c_{fuel}$ is the price of purchasing fuel. The fuel cost is incurred by the operation of the gas turbine.

Constraints: X and U are the range constraints on state and input variables. These are either due to hardware limitations (such as maximum possible flow rate through pumps), or represent the desirable operating range of components.

Constraints $x(k+1) = f(x(k), u(k))$ correspond to the following requirements:

Electricity production must be equal to electricity consumption, implying $$W_{grid}(k)+W_{GT}(k)+W_{ST}(k)=E_{dem}(k)+(W_{p1}(k)+W_{p2}(k)+W_{CH,i}(k)) \quad (20)$$

Cooling demand must be satisfied, implying $$Q_{CHW}(k)+Q_{TES}(k)=Q_{dem}(k) \quad (21)$$

where $Q_{CHW}$ is the cooling provided by chillers, $Q_{TES}$ is that of TES, which can be negative or positive, depending on whether it is in charging or discharging mode.

Remark on Feasibility Issue: A feasible solution for the optimization problem $P_1$ is a set of control actions that can satisfy the campus cooling load $Q_{dem}$ and electricity load $E_{dem}$ in the next 24 hours. In accordance with an exemplary embodiment of the present invention, the assumption is made that the peak cooling load $Q_{dem}$ never exceeds the combined capacity of the chiller group. This assumption, along with the fact that electricity can always be purchased from the power grid, guarantee the existence of a feasible solution, regardless of the current state of the central plant x(t).

Complexity: The optimization problem $P_1$ is a mixed-integer nonlinear optimization problem. Let $n_c$ be the number of chillers, then at each time step k a total of $24(n_c+3)$ decision variables needs to be computed, among which $24*n_c$ take binary values, thus amounting to $2^{24*n_c}$ possible simulations to evaluate.

Dual-Stage Heuristic Algorithm

Heuristic Greedy Search Algorithm—In accordance with an exemplary embodiment of the present invention, described in detail hereinafter is a heuristic algorithm for the mixed integer nonlinear problem described above. The structures of problem $P_1$ are explored to reduce its complexity. In particular, the following observations are made:

The charging of TES should happen in the evening, when the electricity price is cheap, and TES will discharge in daytime.

The optimization can be decomposed into a two stage problem. In the first stage, the cooling demand is satisfied with minimized chiller operation (less electricity consumption). In the second stage, optimal set points at each time step are determined for the power generation components to meet the total electricity demands.

The chillers have different efficiency (COP). Recall that θ is a binary vector of chiller set-points. Let Q(θ) be the cooling provided by the chillers under set-point θ, and W(θ) be the corresponding electricity consumption, $$\frac{Q(\theta)}{W(\theta)}$$

then is the overall COP under θ. Different set-points θ can be ordered according to their efficiency.

The cooling capacity stored in the TES can be regarded as a resource. When the TES is in discharging mode, finding an optimal chiller operation schedule can be recast as a resource allocation problem, e.g., cooling provided in the TES is allocated to different time slots to meet the cooling demand and all other constraints.

Deciding TES operation profile: TES is the key component for shifting the cooling electricity demand away from peak hours. The electricity rates for off-peak, part-peak and peak load hours are different. Intuitively, TES should be charged during off-peak or part-peak hours when electricity is cheap and discharged during the rest of the day. In an exemplary implementation of the algorithm, the charging hours may be set to the first 9 hours of a day, up to 9 AM, and the discharging hours may be from 10 AM to midnight.

We may also set a target status of the TES at 9 AM, in terms of top layer temperature $T_a$; and a final status of the TES at 12 midnight, in terms of bottom layer temperature $T_b$.

In the charging mode, $T_a$ will drop as more chilled water fill the TES. When it reaches the target value $T^*_a$, the charging of the TES is considered finished. In the discharging mode, $T_b$ will increase. As it reaches the final value $T^*_b$, the TES is considered depleted. Target $T^*_a$ is one of the control variables to be optimized. In accordance with an exemplary embodiment of the present invention, a brutal force search may be used to find the best value. $T^*_b$ is upper bounded to guarantee a reasonable ΔT on the load.

The original optimization problem $P_1$ is now divided into two sub-problems based on the operation mode of the TES.

P2: From 12 midnight to 9 AM, when the TES is in charging mode, the objective is to find optimal set-points of all components such that the TES at 9 AM reaches the target status $T^*_a$, the campus cooling demand and electricity demand are both met, while the total cost is minimized.

P3: From 10 AM to 12 midnight, when the TES operates in discharging mode, the objective is to find optimal set-points of all components such that the TES at 12 midnight reaches the final status $T^*_b$, the campus cooling demand and electricity demand are both met, and the total cost is minimized.

Separating cooling optimization and electricity consumption optimization: For each of the sub-problems described above, the optimization for an air-conditioning system (chillers and TES) and a power generation plant (Gas turbine and co-generation) can be separated. This is because the power generation components are modeled as static components. Whenever the electricity demand for a time interval is decided, the optimal operation for the power generation components can be obtained by solving a static nonlinear program (NLP).

Therefore, for each of the subproblems P2 and P3, a two-stage optimization may be performed:

Stage.1, Decide the chiller operating schedule and TES set-points such that all constraints are satisfied and the total chiller electricity consumption (weighted by current electricity price) is minimized.

Stage.2, Given the chiller electricity consumption and campus electricity demand, find the GT operating schedule and purchase plan from the grid that is optimal.

Stage.2, for both sub-problems is not difficult since there are no dynamics involved. The difficulty mainly comes from Stage.1, which is a nonlinear mixed integer program. The complexity of this problem can be reduced by evaluating all set-points θ according to their overall COPs.

Reducing the complexity of the integer program: Some configuration of set-point θ generates the same amount of cooling as other configurations, but consumes more electricity. Such configurations should not be considered as option because there are more efficient alternatives. By eliminating those inefficient configurations, the complexity of the optimization problem will be reduced.

Greedy algorithm: Start with the TES-discharging sub-problem P3. It is assumed that at 10 AM the TES has been charged to target state ($T_a=T^*_a$).

Figure 3:
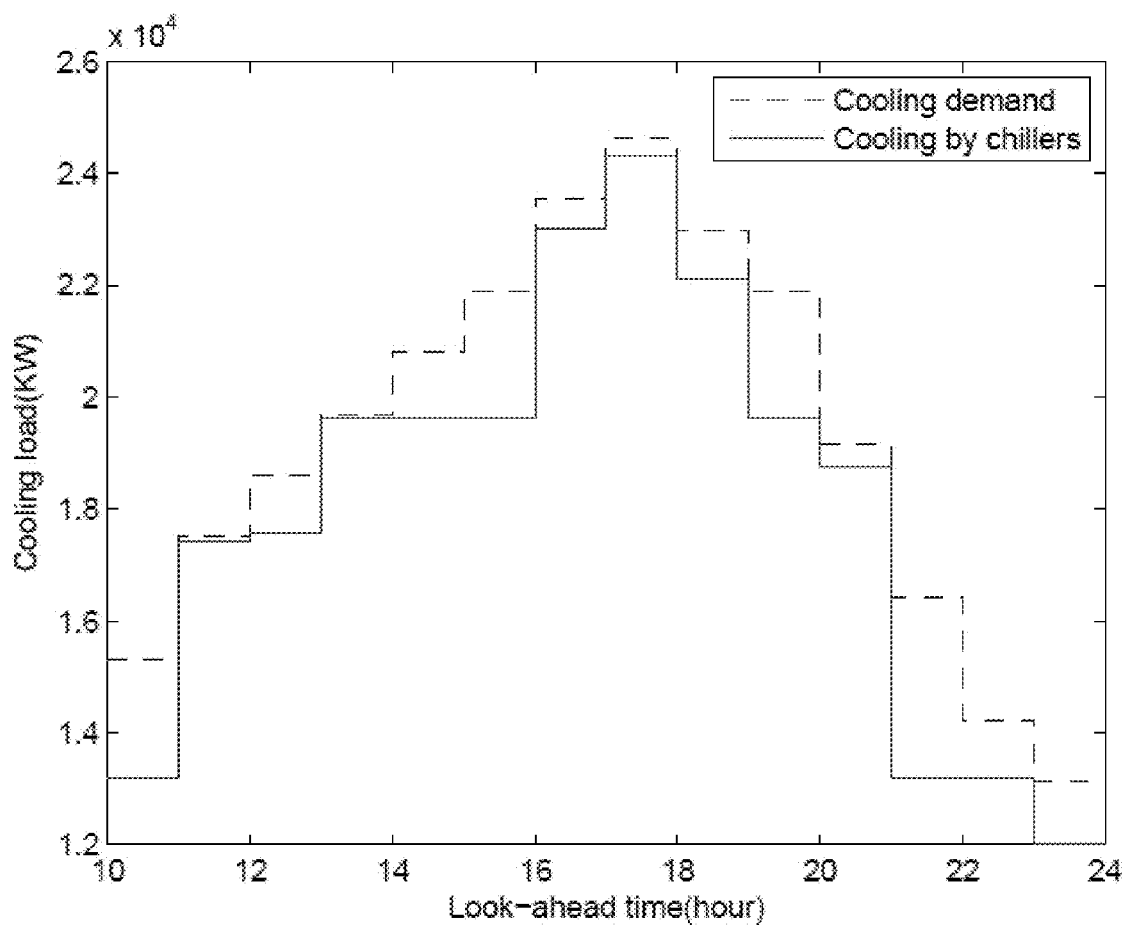
FIG. 3 is a graph showing an initial solution for a discharging sub-problem according to an exemplary embodiment of the present invention.

First generate a baseline solution by operating the chillers and TES in the following way: for every hour from 10 AM to midnight, choose the set-point θ for the chillers such that the cooling they provide is maximized but less than the campus cooling demand. Chilled water from the TES provides the remainder of the cooling to meet campus demand. This is depicted by 300 in FIG. 3. Now the problem is similar to resource allocation, e.g., the goal is to find the optimal way to distribute the cooling capacity stored in the TES to different time slots between 10 AM and 12 midnight, so that the chiller operation cost in this period can be minimized. This problem is solved using a greedy algorithm:

(a) In each iteration, an hour t between 10 AM and 12 midnight is chosen, for which the amount of cooling provided by chillers $Q(\theta(t))$ is reduced by $\Delta Q$. Chilled water from the TES is used to provide $\Delta Q$ and meet campus cooling demand.

(b) The overall COP is used for choosing t and $\Delta Q$. For example, at hour t, let $\tilde{\theta}$ be an alternative to the current chiller configuration $\theta$. The 'relative efficiency gain' $S(\theta,\tilde{\theta})$ is defined as the ratio between the changes in cooling and electricity consumption:

$$S(\theta, \tilde{\theta}) = \frac{\Delta P}{\Delta Q} = \frac{W(\theta) - W(\tilde{\theta})}{Q(\theta) - Q(\tilde{\theta})}.$$

(c) In each iteration, a search among possible alternative configurations for all t is carried out, and the one corresponding to the highest S is chosen. Note that S can be negative, meaning that some chiller configurations may provide less cooling but consume more energy than the current configuration.

(d) After t and $\theta$ are decided, the TES model is simulated for the time period of 10 AM to 12 midnight using new set-points. The final status $T_b$ at midnight indicates how much cooling capacity is left after this iteration.

(e) The greedy algorithm terminates when some constraints are violated. For example, $T_b$ rises above $T^*_b$ at midnight.

$\Theta$ may be used to denote the sequence of chiller set-points from 10 AM to 12 midnight, indexed by t. Let $\underline{\theta}$ be a vector of the chiller set-points indexed by t. The greedy algorithm is summarized below.

---
Algorithm - for chiller and TES set-point optimization
---
while  $T_b(24) < T_b^*$  do
  for t ∈ [10,...,24] do
    θ ← Θ[t]
    $\underline{\theta}$[t]← argmax$_{\tilde{\theta}(t)}$ S(θ,$\tilde{\theta}$(t))
  end for
  θ* ← max($\underline{\theta}$)
  t* ← find($\underline{\theta}$ == θ*)
  Θ[t*]← θ*
  $T_b$(24) = Simulate(Θ)
end while
Θ* ← Θ

---

The sub-problem for the TES charging mode can be solved similarly. An initial solution is obtained by keeping all chillers on for the first 9 hours. A greedy algorithm can then be applied to reduce chiller operations for each hour, until the target condition $T_a(10)=T^*_a$ is violated. The only difference here is that when computing the relative gain S at time t, $\Delta Q(t)$ is no longer the amount of cooling provided by the chillers, but should be the amount of cooling that is charged to the TES. So the status of the TES ($T_a$) needs to be taken into account:

$$\Delta Q(t) = c_p * (T_a(t) - T_{CHWS}) * \Delta m(t)$$

where $\Delta m$ is the difference of flow rate between two different chiller configurations.

Figure 4:
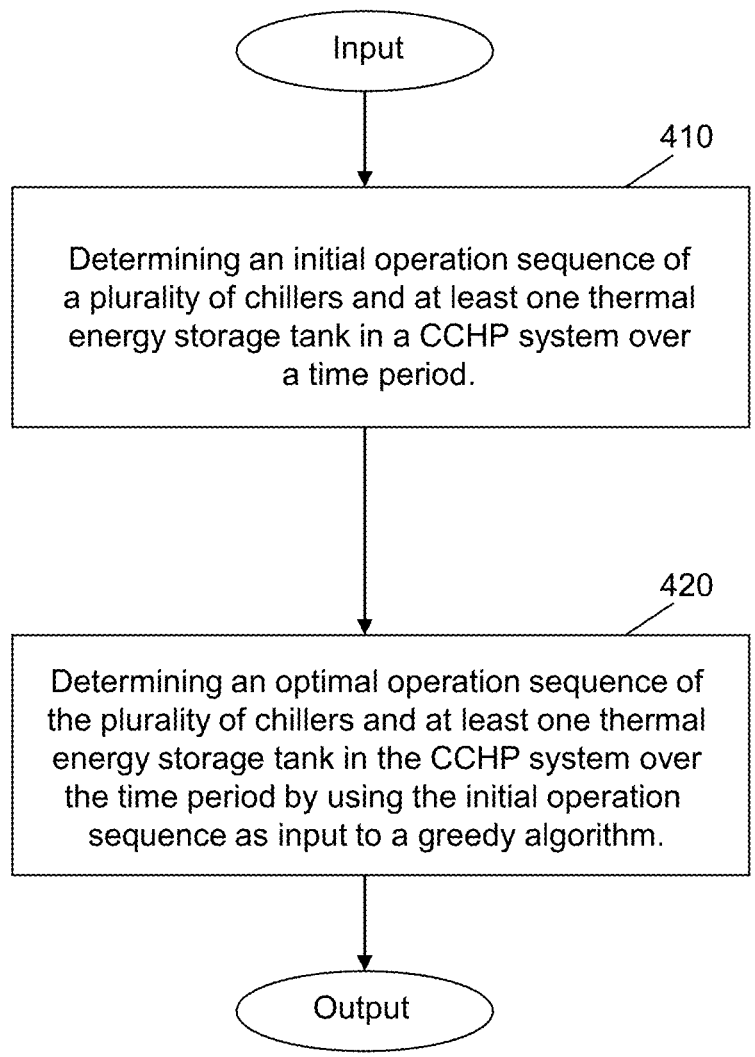
FIG. 4 is a flowchart of a method according to an exemplary embodiment of the present invention.

FIG. 4 is a flowchart of a method according to an exemplary embodiment of the present invention. Details of the following flowchart steps are discussed above in the Dual-Stage Heuristic Algorithm section and can be used to find the optimal sequence of set-points such that both cooling and electricity demand on campus are satisfied while the operation cost of the central plant is minimized.

As shown in FIG. 4, an initial operation sequence of a plurality of chillers and at least one thermal energy storage tank in the system over a time period (e.g., 24 hours) is determined (410). Then, an optimal operation sequence of the plurality of chillers and at least one thermal energy storage tank in the system over the time period is determined by using the initial operation sequence as input to a greedy algorithm (420).

When the optimal operation sequence is determined, cooling optimization is complete. Now, electricity optimization can be performed. This is so, because based on the result of cooling optimization we can determine the total electricity demand for the next 24 hours. Electricity optimization involves determining how to operate the generators of the CCHP system to satisfy the electricity needs over the next 24 hours.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
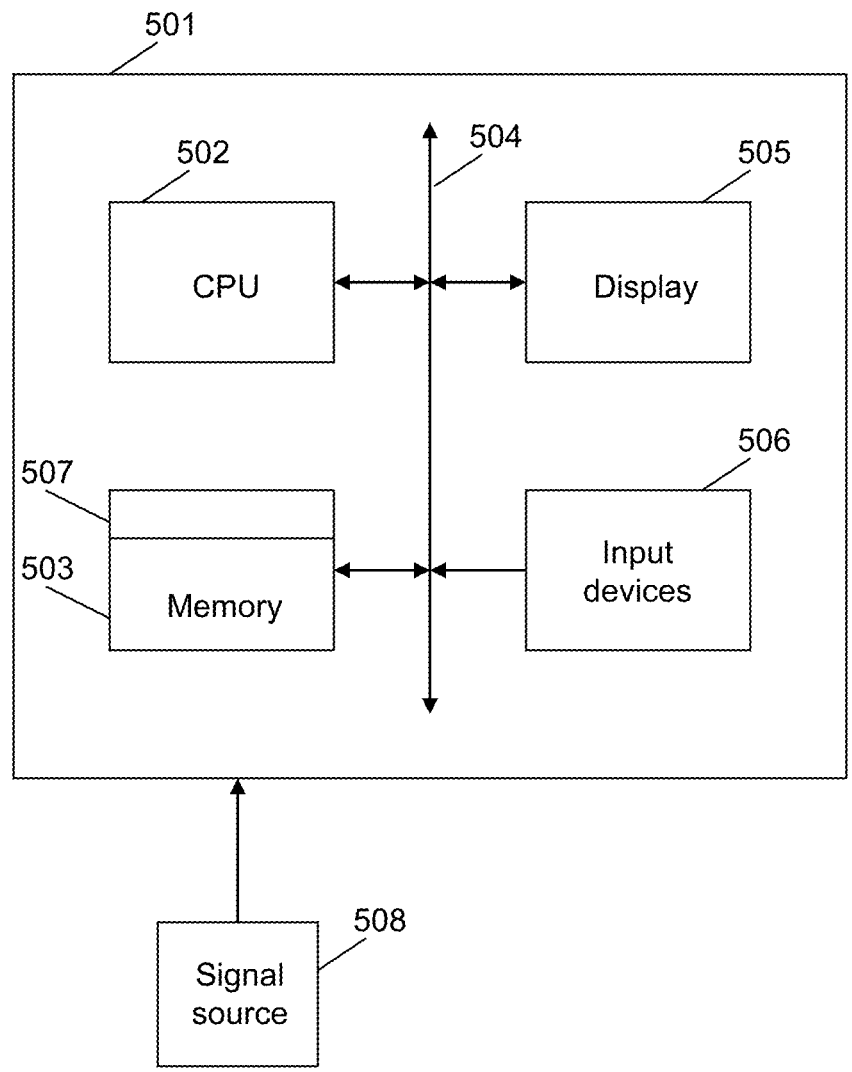
FIG. 5 illustrates a computer system in which an exemplary embodiment of the present invention may be implemented.

Referring now to FIG. 5, according to an exemplary embodiment of the present invention, a computer system 501 can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include RAM, ROM, disk drive, tape drive, etc., or a combination thereof. Exemplary embodiments of present invention may be implemented as a routine 507 stored in memory 503 (e.g., a non-transitory computer-readable storage medium) and executed by the CPU 502 to process the signal from a signal source 508. As such, the computer system 501 is a general-purpose computer system that becomes a specific purpose computer system when executing the routine 507 of the present invention.

The computer system 501 also includes an operating system and micro-instruction code. The various processes and functions described herein may either be part of the micro-instruction code or part of the application program (or a combination thereof) which is executed via the operating system. In addition, various other peripheral devices may be connected to the computer system 501 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method of real-time optimization for a Combined Cooling, Heating and Power system, the method being implemented with a computing system having at least one processor coupled with memory-stored executable instructions which, when executed by the processor, cause the processor to perform the method, comprising:

determining a first operation sequence of a plurality of chillers and at least one thermal energy storage tank in the system over a time period during which the at least one thermal energy storage tank is in a charging mode; and determining a second operation sequence of the plurality of chillers and the at least one thermal energy storage tank in the system over the time period by using the first operation sequence as input to a greedy algorithm, wherein the second operation sequence comprises a plurality of optimal set-points during the first time period for the plurality of chillers and the at least one thermal energy storage tank such that a temperature of the at least one thermal energy storage tank drops to a target temperature at conclusion of the time period, wherein determining the second operation sequence comprises:

generating a baseline solution by operating the plurality of chillers and the at least one thermal energy storage tank over the time period such that cooling provided by the plurality of chillers is maximized but less than a cooling demand, wherein a remainder of the cooling demand is met by the thermal energy storage tank; and iteratively selecting different chiller configurations for different portions of the time period, wherein each chiller configuration comprises a reduction in an amount of cooling provided by a different chiller of the plurality of chillers, wherein the at least one thermal energy storage tank provides the amount of cooling that is reduced, and wherein an alternative chiller configuration having a higher relative efficiency gain than a current chiller configuration is selected for each successive iteration.

2. The method of claim 1, wherein the cost of satisfying cooling demand by performing the second operation sequence for the time period is less than the cost of satisfying cooling demand by performing the first operation sequence for the time period.

3. The method of claim 1, further comprising ranking the chillers according to their efficiency prior to determining the first operation sequence.

4. The method of claim 1, wherein the plurality of set-points correspond to a plurality of sub-time periods of the time period.

5. The method of claim 4, wherein the plurality of set-points include on/off states for each chiller, total chilled water supplied by the system, operating power level of at least one gas turbine of the system, or power purchased from a power grid.

6. The method of claim 4, wherein the time period is more than one hour.

7. The method of claim 1, further comprising outputting the second operation sequence.

8. A system for real-time optimization for a Combined Cooling, Heating and Power system, comprising:

a memory device for storing a program;
a processor in communication with the memory device, the processor operative with the program to:
determine an initial operation sequence of a plurality of chillers and at least one thermal energy storage tank in the system over a time period during which the at least one thermal energy storage tank is in a charging mode; and determine an optimal operation sequence of the plurality of chillers and at least one thermal energy storage tank in the system over the time period by using the initial operation sequence as input to a greedy algorithm, wherein the second operation sequence comprises a plurality of optimal set-points during the first time period for the plurality of chillers and the at least one thermal energy storage tank such that a temperature of the at least one thermal energy storage tank drops to a target temperature at conclusion of the time period, wherein the processor is operation to determine the optimal operation sequence by:

generating a baseline solution by operating the plurality of chillers and the at least one thermal energy storage tank over the time period such that cooling provided by the plurality of chillers is maximized but less than a cooling demand, wherein a remainder of the cooling demand is met by the thermal energy storage tank; and iteratively selecting different chiller configurations for different portions of the time period, wherein each chiller configuration comprises a reduction in an amount of cooling provided by a different chiller of the plurality of chillers, wherein the at least one thermal energy storage tank provides the amount of cooling that is reduced, and wherein an alternative chiller configuration having a higher relative efficiency gain than a current chiller configuration is selected for each successive iteration.

9. The system of claim 8, wherein the cost of satisfying cooling demand by performing the optimal operation sequence for the time period is less than the cost of satisfying cooling demand by performing the initial operation sequence for the time period.

10. The system of claim 8, wherein the processor is further operative with the program to rank the chillers according to their efficiency prior to determining the initial operation sequence.

11. The system of claim 8, wherein the plurality of set-points corresponds to a plurality of sub-time periods of the time period.

12. The system of claim 11, wherein the plurality of set-points include on/off states for each chiller, total chilled water supplied by the system, operating power level of at least one gas turbine of the system, or power purchased from a power grid.

13. The system of claim 11, wherein the time period is more than one hour.

14. The system of claim 8, wherein the processor is further operative with the program to output the optimal operation sequence.

15. A computer program product for real-time optimization for a Combined Cooling, Heating and Power system, comprising:

a non-transitory computer readable storage medium having computer readable program code embodied therewith, the computer readable program code comprising:
computer readable program code configured to perform the steps of:
determining an initial operation sequence of a plurality of chillers and at least one thermal energy storage tank in the system over a time period during which the at least one thermal energy storage tank is in a charging mode; and determining an optimal operation sequence of the plurality of chillers and the at least one thermal energy storage tank in the system over the time period by using the initial operation sequence as input to a greedy algorithm, wherein the second operation sequence comprises a plurality of optimal set-points during the first time period for the plurality of chillers and the at least one thermal energy storage tank such that a temperature of the at least one thermal energy storage tank drops to a target temperature at conclusion of the time period, wherein determining the optimal operation sequence comprises:

generating a baseline solution by operating the plurality of chillers and the at least one thermal energy storage tank over the time period such that cooling provided by the plurality of chillers is maximized but less than a cooling demand, wherein a remainder of the cooling demand is met by the thermal energy storage tank; and iteratively selecting different chiller configurations for different portions of the time period, wherein each chiller configuration comprises a reduction in an amount of cooling provided by a different chiller of the plurality of chillers, wherein the at least one thermal energy storage tank provides the amount of cooling that is reduced, and wherein an alternative chiller configuration having a higher relative efficiency gain than a current chiller configuration is selected for each successive iteration.

16. The computer program product of claim 15, wherein the cost of satisfying cooling demand by performing the optimal operation sequence for the time period is less than the cost of satisfying cooling demand by performing the initial operation sequence for the time period.

17. The computer program product of claim 15, wherein the computer readable program code is further configured to perform the step of ranking the chillers according to their efficiency prior to determining the initial operation sequence.

18. The computer program product of claim 15, wherein the plurality of set-points corresponds to a plurality of sub-time periods of the time period.

19. The computer program product of claim 18, wherein the plurality of set-points include on/off states for each chiller, total chilled water supplied by the system, operating power level of at least one gas turbine of the system, or power purchased from a power grid.

20. The computer program product of claim 18, wherein the time period is 24 hours and each sub-time period is 1 hour.

\* \* \* \* \*